US005763509A

United States Patent [19]

Eastin et al.

[11] Patent Number: 5,763,509
[45] Date of Patent: Jun. 9, 1998

[54] BINDER CONTAINING PLANT PROTEIN AND DENSIFIED REFUSE FUEL CUBES MADE USING SAME AND METHODS OF MAKING THEM

[75] Inventors: Jerry D. Eastin, Ceresco; David Jones, Lincoln, both of Nebr.; Darin Dux, Pella, Iowa; Harold Earl Egger, Hickman, Nebr.

[73] Assignee: The Board of Regents of the University of Nebraska, Lincoln, Nebr.

[21] Appl. No.: 629,377

[22] Filed: Apr. 8, 1996

Related U.S. Application Data

[60] Continuation-in-part of Ser. No. 261,685, Jun. 17, 1994, Pat. No. 5,506,285, which is a division of Ser. No. 954,740, Sep. 29, 1992, Pat. No. 5,344,871, which is a division of Ser. No. 659,453, Feb. 21, 1991, Pat. No. 5,153,242, which is a continuation of Ser. No. 511,833, Apr. 13, 1990, abandoned, which is a continuation of Ser. No. 173,921, Mar. 28, 1988, abandoned, which is a continuation-in-part of Ser. No. 144,663, Jan. 12, 1988, abandoned, which is a continuation of Ser. No. 712,518, Mar. 18, 1985, abandoned, and a continuation-in-part of Ser. No. 145,028, Oct. 28, 1993, Pat. No. 5,374,670, which is a continuation-in-part of Ser. No. 659,458, Feb. 21, 1991, abandoned, which is a continuation of Ser. No. 503,135, Mar. 30, 1990, abandoned, which is a continuation of Ser. No. 378,429, Jul. 11, 1989, abandoned, which is a continuation of Ser. No. 144,663, Jan. 12, 1988, abandoned, which is a continuation of Ser. No. 712,518, Mar. 18, 1985, abandoned.

[51] Int. Cl.$^6$ .................. C08J 89/00; C08K 11/00; C08L 1/00

[52] U.S. Cl. .................. 524/13; 524/14; 524/15; 524/16; 524/35; 264/122; 264/165; 44/21

[58] Field of Search ............... 524/13, 14, 15, 524/16, 35; 264/122, 165; 44/21

[56] References Cited

U.S. PATENT DOCUMENTS

| | | |
|---|---|---|
| 2,319,182 | 5/1943 | Van der Pyl . |
| 2,440,789 | 5/1948 | Van der Pyl . |
| 3,686,384 | 8/1972 | Runton . |
| 3,793,125 | 2/1974 | Kunz . |
| 3,927,235 | 12/1975 | Chow . |
| 3,956,555 | 5/1976 | McKean . |
| 3,968,294 | 7/1976 | Rebitschek et al. . |
| 4,097,648 | 6/1978 | Pringle . |
| 4,203,876 | 5/1980 | Dereppe et al. . |
| 4,225,640 | 9/1980 | Erb . |
| 4,234,658 | 11/1980 | Chow . |
| 4,246,310 | 1/1981 | Hunt et al. . |
| 4,279,790 | 7/1981 | Nakajima . |
| 4,529,407 | 7/1985 | Johnston et al. ............... 44/21 |
| 4,613,339 | 9/1986 | Gunnerman et al. ............ 44/1 D |

*Primary Examiner*—Nathan M. Nutter
*Attorney, Agent, or Firm*—Vincent L. Carney

[57] ABSTRACT

To form a binder from naturally occurring products or a fuel brick or pellet using the binder without extraction or purification steps, the binder utilizes proteins from the germ or endosperm of cereal grasses or from the seed of buckwheat, oil seed plants, Amaranthus or leguminous plants or from leaves or from grain stillage. The protein has a thermoplastic microstructure with linear polymers of molecular weight of at least 2,000 linked with peptide linkages of at least 50 in number. The binder is mixed with waste such as municipal waste without further processing and processed in a pelleting machine.

6 Claims, 1 Drawing Sheet

BINDER CONTAINING PLANT PROTEIN AND DENSIFIED REFUSE FUEL CUBES MADE USING SAME AND METHODS OF MAKING THEM

REFERENCE TO RELATED APPLICATIONS

This application is a continuation-in-part of U.S. application Ser. No. 08/261,685 filed Jun. 17, 1994 now U.S. Pat. No. 5,506,285, which is a division of U.S. application Ser. No. 07/954,740 filed Sep. 29, 1992, now U.S. Pat. No. 5,344,871, which is a division of U.S. application Ser. No. 07/659,453 filed Feb. 21, 1991, now U.S. Pat. No. 5,153,242, which is a continuation of U.S. application Ser. No. 07/511,833 filed Apr. 13, 1990, now abandoned, which is a continuation of U.S. application Ser. No. 07/173,921 filed Mar. 28, 1988, now abandoned, which is a continuation-in-part of U.S. application Ser. No. 07/144,663 filed Jan. 12, 1988, now abandoned, which is a continuation of U.S. application Ser. No. 06/712,518 filed Mar. 18, 1985, now abandoned and assigned to the same assignee as this application; and this application is also a continuation-in-part of U.S. application Ser. No. 08/145,028 filed Oct. 28, 1993, now U.S. Pat. No. 5,374,670, which is a file wrapper continuation-in-part of U.S. application Ser. No. 07/659,458 filed Feb. 21, 1991, now abandoned, which is a continuation of U.S. application Ser. No. 07/503,135 filed Mar. 30, 1990, now abandoned, which is a continuation of U.S. application Ser. No. 07/378,429 filed Jul. 11, 1989, now abandoned, which is a continuation of U.S. application Ser. No. 07/144,663 filed Jan. 12, 1988, now abandoned, which is a continuation of U.S. application Ser. No. 06/712,518 filed Mar. 18, 1985, now abandoned, and assigned to the same assignee as this application.

BACKGROUND OF THE INVENTION

This invention relates to binders and densified refuse fuel cubes made using the binders.

In making one class of binder, hereinafter referred to as biological binders, naturally occurring agricultural products are processed to remove materials usable for binders for either naturally occurring products or synthetic products. In a prior art type of binder of this class, the carbohydrates or lignin materials from the stalks or foliage of plants are removed from the plant and processed to form a binder. For example, in G. E. Hartford, "Production of Insulating Board from Cornstalks" *Industrial and Engineering Chemistry* v. 22, number 12, pp. 1280–1289, December 1930, it is suggested that pentosan sugars be removed from cornstalk pulp and used as adhesive. It is known from Davis, R. A. and T. A Koep 1990 to pelletize waste using calcium carbonate as a binder. Waste pellets have been used to generate energy.

These prior art binders, methods of making them, methods of using them and structures made with them have disadvantages in that they are relatively expensive because of the excessive processing necessary for their use. Moreover, many of the structures absorb excessive amounts of moisture and possess inadequate mechanical properties for convenient transportation.

SUMMARY OF THE INVENTION

Accordingly, it is an object of the invention to provide an improved binder.

It is a further object of the invention to provide an improved method for forming binders.

It is a still further object of the invention to provide an improved method of making structures such as fuel cubes using binders.

It is a still further object of the invention to provide an inexpensive binder made from waste materials such as stillage or the like.

It is a still further object of the invention to provide a novel refuse pellet and method of making it.

It is a still further object of the invention to use grain and grain by-products as a binder for refuse pellets and to use such pellets as fuel.

In accordance with the above and further objects of the invention, one embodiment of a binder includes naturally occurring plant proteins with the proteins having a thermoplastic microstructure with linear polymers of molecular weight of at least 2000 linked with peptide linkages of at least 50. The other agricultural materials such as carbohydrates are at least 5 percent of the binder by molecular weight.

In another embodiment requiring higher temperatures and/or pressures, the binder relies principally upon naturally occurring plant lipids rather than protein and need not have significant protein. In this embodiment, the carbohydrates are at least 5 percent of the binder by molecular weight.

In using the binder, refuse is adhered together by penetration of the surface and polymerization and/or to some extent chemical reactions with the surfaces, and/or by temporary alteration of the protein molecule structure to a form that engages the surface followed by another alteration to cause binding. Pellets of refuse for fuel may be made using the binder.

In one embodiment, a pressure of at least 20 psi and/or a temperature of 175 degrees Fahrenheit in the pellet are created on and in refuse mixed with binder to form fuel cubes. The pressure and/or temperature are applied for a sufficient time to alter the molecular structure such as by causing polymerization of the protein. No chemical additives are necessary but it is useful to have sufficient water present to increase heat transfer for uniform temperature and to render the protein sufficiently flexible or mobile to come into intimate contact with and flow around the contours of surfaces to be bound together.

The time for application of pressure and heat must be long enough to permit temperature to become substantially uniform in the material and to cause reactions of the amide and/or carboxyl groups. The exact value in some instances can be determined by experimentation, but is at least one second, and longer unless a non-conventional method of heat is used such as ultraviolet radiation.

To determine the pressure and/or temperature needed to obtain desired density in the fuel cube, a measured quantity of uncured material is subjected to different pressures until the proper density or range of densities is achieved. The density is determined by any suitable method including those specified in ASAE S269.4 (1993).

The binder may be formed either from whole grain or defatted grain, with the oils being used for other purposes or from other by-products such as stillage from alcohol plants including the yeast. More generally it should include plant protein such as from the germ and/or endosperm of cereal grasses, oil seed plants or buckwheat seed or the seed of leguminous plants or from foliage of certain protein foliage plants or from Amaranthus or certain Xerophytic plants such as Partheium argentatum. In the preferred embodiment corn stillage is used.

DESCRIPTION OF THE DRAWINGS

The above noted and other features of the invention will be better understood from the following detailed description when considered with reference to the accompanying drawings, in which.

DETAILED DESCRIPTION

Broadly, a binder includes naturally occurring proteins and/or lipids in agricultural products. The proteins may have a thermoplastic microstructure with linear polymers of molecular weight of at least 2000 linked with peptide linkages of at least 50 in number and usually includes carbohydrates and oils naturally occurring in the same agricultural product as the protein, with the carbohydrates being at least 5 percent of the protein by molecular weight. The lipids, carbohydrates and proteins may be removed in some applications for other commercial use, leaving at least lipids or protein as a principal part of the binder. In the preferred embodiment, corn stillage from ethanol plants is used.

In one embodiment, grain stillage having a water content by weight of between 40 and 60 percent and a protein and a protein content of between 20 and 80 percent is mixed with a protein reactant no greater than one-fifth of the total weight of the binder mixture, and under some circumstances with no reactant the mixture is used with fiber of at least equal in weight to the binder. This embodiment may be used to aid in the formation of brickets or pellets of waste material such as municipal garbage for burning either after storage and/or transportation or on site. If oils are present, an initiator may be added.

In another embodiment, the binder may be a grain or grain part. The cure time should be in a range of 1 to 6 hours at a temperature of between 195 degrees Celsius to 140 degrees Celsius, with one hour being used at 195 degrees and corresponding longer times for lower temperatures. The amount of water should be in the range of ⅛ to ⅓ the total weight of the mixture and the binder should be in the range of between ¼ to ½ the total weight of the mixture.

Figure 1:
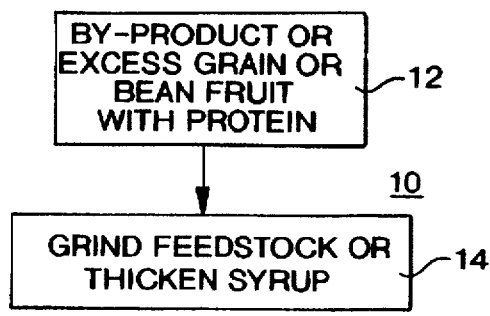
FIG. 1 is a block diagram of a process for making binder.

In FIG. 1, there is shown a flow diagram 10 of a general process for making a binder including: (1) the step 12 of obtaining a source of by-product or excess grain or bean fruit or leaves containing protein as a feedstock; and (2) the step 14 of grinding the feedstock to reduce its size to smaller than 18 mesh or thickening stillage into a thick syrup by evaporation of water. The word "grain", in this application, is used in its general sense to include not only the seeds of cereal grasses or buckwheat but also the fruit of other plants which are leguminous such as beans. An example of a by-product is grain stillage.

While there are variations in the methods of making the binder, the general steps of the preferred embodiment are the same and they include first the step of obtaining the feedstock in adequate quantities and then grinding the feedstock or thickening it by removing water after it has been obtained.

The step 12 of obtaining a feedstock includes the step of obtaining any high protein agricultural product such as corn, sorghum or soybean which has within its germ or bean a protein capable of cross linking as a binder. While the grain or bean itself with all of its materials may be utilized, advantageously, the grain or bean may be used for other purposes first and the by-products used to make binder under some circumstances. For example, grains which have had the starch removed in the process of forming alcohol or defatted corn germ in which the oil has been sold as a by-product may be used to make binder. Preferably, stillage is used.

For example, the fruit of the corn includes a germ portion which is high in one type of proteins and a storage portion with other proteins all encased in a cellulose portion. In the preferred embodiment, protein must be present but the lipids, the cellulose and the material resulting in ash if burned or some carbohydrates may be removed. In practice, the lipids may be used in other processes or removed for sale as a vegetable oil and in the case of stillage (a distillation waste), the germ may be spent leaving storage protein and lipids in the endosperm.

Prior to converting the feedstock into a binder, it may be necessary in some cases to grind it to a consistency, the particle size of which readily blends to form a colloidal solution or to thicken stillage for better adherence to the members that are to be bound together. In its simplest form this is a grinding operation which reduces the feedstock to a size at least as low as 18 mesh and may be coupled with a straining or filtering operation as well as with dissolving type operations. In more complex formulations, collidol suspensions or emulsion may be used. The grinding may be by standard milling equipment or any other means suitable to create a consistency for the particular application. The binder must be finer for use as a binder for large pieces such as the formation of plywood than for composit board. The binder can be stored and, when appropriate, mixed with water and used.

Although protein binders do not require an initiator, they may be improved at an added cost with an additive that enhances the cross linking mechanism. To form a binder principally of protein but including an additive, an additive which forms amide cured epoxys and polyamide is an especially desired additive and can be added but not permitted to react until the binder is in use. A suitable additive is an oxirane, the activity of which is initiated by other forms of energy, such as light, or heat. In this specification, oxiranes means hydrocarbon molecules having oxirane (epoxide) groups and being generally linear or branched. Preferably, additives are not used.

In addition to the ability to polymerize, the binder may have the ability to bind to the particles or members being attached together by chemical reactions. The binder may attach by mechanical adhering or by permeation into the members to be bound because of its mobility as a lower molecular-weight protein and polymerization to a higher molecular weight to form a binder to hold the members. Thus, it may permeate into the members, and by polymerization, form a solid bond between the members. Additionally, a chemical reaction may take place between the binder and the material to be bound and the protein molecule may become altered in configuration with heat and placticizers such as water permeate the surface and upon cooling become more dense and bind the surface.

Temperature alone may be the initiator of polymerization and nothing added to the protein. The basic mer of the protein in the embryo is —NHCHRCO—)n representing a structure of a polyamide or polypeptide. Thus the protein polymer length may be further increased by initiators and reactive monomers to form a binder but also at high temperatures may be denatured resulting into other reactive components such as glutamic acid, leucine, alanine, proline and tyrosine, each having different chemical branches, some saturated and some unsaturated.

At higher temperatures, some bonding may be made with cellulose of waste agricultural materials or municipal waste such as, for example, bonding between the glutamic acid and the cellulose to form an ester. Binder between cellulose and other materials and polymerization may both apply so that at high temperatures, the protein is denatured and then polymerized at some bonds while other bonds are formed by the high temperature creating chemical bonding with the material.

Some oil in a principally protein binder product may have a plasticising effect and uncontrolled amounts of the lipids may cause unpredictable modulus of elasticity, low and unpredictable strength and other unpredictable characteristics. They may be controlled in amount such as by removal by polymerization if they are excessive.

An economically synergistic process is to obtain grain stillage or to purchase defatted grain and utilize only the protein. This is economical because the oils are a valuable part of the grain and may readily be sold or used by distillers. Indeed, defatted grain is available on the market as a waste product, as well as from sources such as distillary grains from alcohol production which utilizes principally the starches of the grain, as processed meal from defatted soybeans, corn germ, peanuts, sunflowers or flax.

Figure 2:
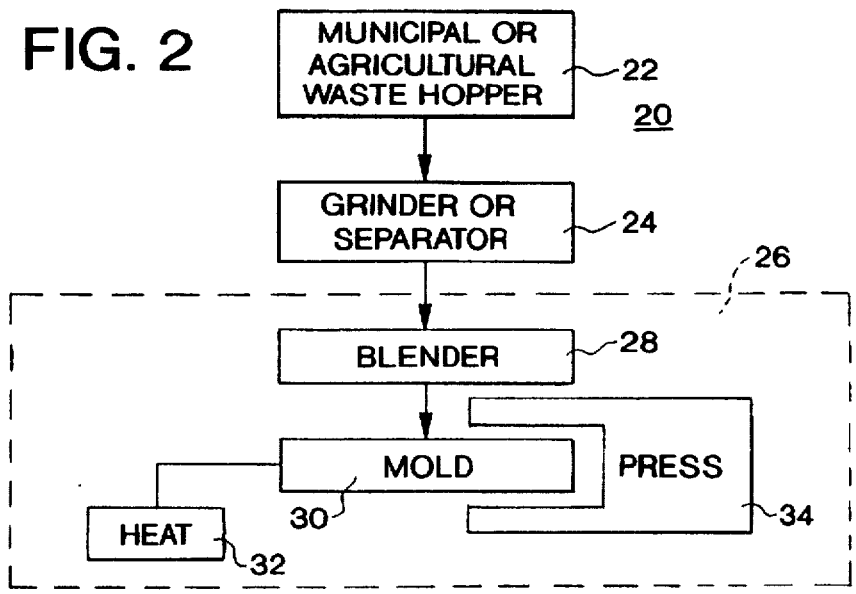
FIG. 2 is a simplified schematic diagram an apparatus for forming structures using the binder.

In FIG. 2, there is shown a simplified version of an apparatus 20 for forming structures using the binder having a municipal or agricultural waste hopper 22, a grinder or separator apparatus 24 and a pellet or brick forming apparatus 26. The municipal or agricultural waste hopper 22 may include municipal or agricultural waste or any other filler. The grinder or separator 24 removes selected materials such as some metals and prepares it to the consistency required for the forming apparatus 26. The binder, when added, may be combined with the filler in the forming apparatus 26. In the preferred embodiment, the binder is corn stillage and for some waste products the grinder or separator 24 is not used. In the preferred embodiment the filler is municipal solid waste typically including about 24 percent compost, four percent glass, seven percent recyclable paper, five percent porous metals, one percent plastic, one percent aluminum, 13 per cent miscellaneous waste suitable for landfills and 45 percent non-recyclable fiber based waste.

The forming apparatus 26 includes a blender 28, a molding apparatus 30, a source of heat or heater 32 and a pressing apparatus 34. The blender 28 may not be neeeded where binder is not added but is already part of the filler and the heater 32 may be eliminated if pressure from the press 34 is adequate to generate sufficient heat to cause polymerization in the mold 30.

In operation, the waste in the municipal or agricultural waste hopper 22 may be ground to the proper consistency in the grinder or separator 24 and/or some materials may be removed or other appropriate processing take place, and if a binder is to be used, the binder is mixed into it. Water is blended into it in a sufficient amount to provide heat transfer, and alter the protein with heat to increase binding upon drying. The mixture is then applied to the mold 30 which may be a die for densified refuse fuel cubes such as pellets or briquettes made one-by-one in a single mold or may be a continuous conveyor mold.

In the mold 30, pressure and supplementary heat, if necessary, is applied to reach the temperature for polymerization of the protein. The higher of the temperatures for the polymerization of lipids or proteins is used in accordance with the nature of the binder. The heat and water also increase the mobility of the protein and enable it to better form around the binding surfaces. Thus, when cooled and dried, the protein becomes vitrified and also binds to the surface via primary or secondary bonds.

An optimum formulation for soybean is 100 parts of fiber, 50 parts of water and, 50 parts of defatted bean. If the cure temperature is higher than 165 degrees Celsius, the cure time can be reduced. If the cure temperature is below 165 degrees Celsius, more than 5 hours is required.

EXAMPLES

The following non-limitative examples illustrate the invention.

General Conditions Composition Boards

The samples of board were tested in each case using the methods specified in ASTM standard ASTM D 1037-78 found in the 1981 Annual Book of ASTM Standards Part 22. Testing was done at the University of Nebraska.

Example 1

One hundred parts of corn germ were ground to 18 mesh and mixed with 50 parts of water and 100 parts of corn fiber. A board was made and cured at a temperature of 330 degrees Fahrenheit for 1.5 hours in an aluminum mold. The board was tested as described in the general procedures. The results are shown in Table 1.

Example 2

Eighty parts of corn germ were ground to 18 mesh and mixed with 50 parts of water and 100 parts of corn fiber. A board was made and cured at a temperature of 330 degrees Fahrenheit for 1.5 hours in an aluminum mold. The board was tested as described in the general procedures. The results are shown in Table 1.

Example 3

Sixty parts of corn germ were ground to 18 mesh and mixed with 50 parts of water and 100 parts of corn fiber. A board was made and cured at a temperature of 330 degrees Fahrenheit for 1.5 hours in an aluminum mold. The board was tested as described in the general procedures. The results are shown in Table 1.

TABLE 1

Effect of Increasing Germ On Mechanical Properties

| Stover 1b | Water 1b | Germ 1b | Elastic MOD (PSI) | Rupture MOD(PSI) | Specific Gravity | % Thickness Change |
|---|---|---|---|---|---|---|
| 100 | 50 | 100 | 86,129 | 894 | 0.76 | 36.4 |
| 100 | 50 | 80 | 86,401 | 760 | 0.73 | 32.8 |
| 100 | 50 | 60 | 82,441 | 910 | 0.76 | 44.3 |
| 100 | 50 | 50 | 60,457 | 751 | 0.75 | 31.0 |
| 100 | 50 | 40 | 69,454 | 803 | 0.76 | 25.0 |

Example 4

Fifty parts of corn germ were ground to 18 mesh and mixed with 50 parts of water and 100 parts of corn fiber. A board was made and cured at a temperature of 330 degrees Fahrenheit for 1.5 hours in an aluminum mold. The board was tested as described in the general procedures. The results are shown in Table 1.

Example 5

Forty parts of corn germ were ground to 18 mesh and mixed with 50 parts of water and 100 parts of corn fiber. A board was made and cured at a temperature of 330 degrees Fahrenheit for 1.5 hours in an aluminum mold. The board was tested as described in the general procedures. The results are shown in Table 1.

In the meantime, the different cure time for the oil polymerization was considered. A two-stage curing process was suggested, one for oil polymerization curing, the other for the original curing process. The temperature used in the stage-one cure was chosen based on the theoretical chain-growth cure temperature range. The following temperatures 80, 100 and 120 degrees Celsius were used. At each temperature, the following cure times 1, 2, 3 and 4 hours were used. The formulation was not changed. The curing condition in stage two was still 160 degrees Celsius and 4 hours. The results, see Table 2, show that the optimal point for stage-one curing is at 80 degrees Celsius and for between 1 and 2 hours.

Example 6

Thirty-three parts of corn stillage were mixed with 100 parts of sawdust and 6 parts of oxirane (Ciba-Geigy (9138)) obtainable from Ciba-Geigy Corporation. The stillage had water within it. The boards had a specific gravity of 0.72 and were cured at a pressure of 200 psi, a temperature of 325 degrees Fahrenheit for 45 minutes. three samples were tested and they showed for the first sample a modulus of rupture of 1457 psi and a modulus of elasticity of 886, 788 psi; for the second sample, a modulus of rupture of 518 psi and amodulus of elasticity of 302,741 psi; and for the third sample, a modulus of rupture of 1128 and a modulus of elasticity of 602,646. The level of deviation from sample to sample is probably related to inconsistency in mixing of filler and binder.

TABLE 2

Effect of Cure Time and Temperature at Stage One of Milo Stillage Board

| Temp 1 C. | Time 1 hr | Temp 2 C. | Time 2 hr | MOE psi | MOR psi |
| --- | --- | --- | --- | --- | --- |
| 80 | See Table 12 | | | | |
| 100 | 1 | 160 | 4 | 144,000 | 979 |
| 100 | 2 | 160 | 4 | 131,000 | 904 |
| 100 | 3 | 160 | 4 | 137,000 | 941 |
| 100 | 4 | 160 | 4 | 137,000 | 753 |
| 120 | 1 | 160 | 4 | 91,300 | 758 |
| 120 | 2 | 160 | 4 | 113,000 | 858 |
| 120 | 3 | 160 | 4 | 110,000 | 672 |
| 120 | 4 | 160 | 4 | 101,000 | 747 |

Example 7

Thirty-three parts of corn stillage were mixed with 100 parts of sawdust and 6 parts of oxirane (Epon (828)). The stillage had water within it. The boards had a specific gravity of 0.7215 and were cured at a pressure of 200 psi, a temperature of 325 degrees Fahrenheit for 45 minutes. Three samples were tested and they showed for the first sample a modulus of rupture of 1000 psi and a modulus of elasticity of 678,792 psi; for the second sample, a modulus of rupture of 410 psi and a modulus of elasticity of 680,577 psi; and for the third sample, a modulus of rupture of 796 and a modulus of elasticity of 463,550.

Example 8

Thirty-three parts of corn stillage were mixed with 100 parts of wood chips and 4 parts of oxirane (Epon (828)). The stillage had water within it. the boards had a specific gravity of 0.7215 and were cured at a pressure of 200 psi, a temperature of 325 degrees Fahrenheit for 45 minutes. Three samples were tested and they showed for the first sample a modulus of rupture of 1031 psi and a modulus of elasticity of 550,080 psi; for the second sample, a modulus of rupture of 430 psi and a modulus of elasticity of 225,205 psi; and for the third sample, a modulus of rupture of 713 and a modulus of elasticity of 393,182.

Example 9

Thirty-three parts of corn stillage were mixed with 100 parts of wood chips, 2 parts of oxirane (Epon (828)). The stillage had water within it. The boards had a specific gravity of 0.7215 and were cured at a pressure of 200 psi, a temperature of 325 degrees Fahrenheit for 45 minutes. Three samples were tested and they showed for the first sample a modulus of rupture of 345 psi and a modulus of elasticity of 183,542 psi; for the second sample, a modulus of rupture of 313 psi and a modulus of elasticity of 139,355 psi; and for the third sample, a modulus of rupture of 594 and a modulus of elasticity of 257,735.

Example 10

Thirty-three parts of corn stillage were mixed with 100 parts wood chips. The stillage had water within it. The boards had a specific gravity of 0.7022 and were cured at a pressure of 200 psi, a temperature of 325 degrees Fahrenheit for 45 minutes. Three samples were tested and they showed for the first sample a modulus of rupture of 787 psi and a modulus of elasticity of 483,853 psi; for the second sample, a modulus of rupture of 525 psi and a modulus of elasticity of 318,664 psi; and for the third sample, a modulus of rupture of 330 and a modulus of elasticity of 192,778.

Example 11

Thirty-three parts of milo stillage were mixed with 100 parts of wood chips and 4 parts of oxirane (Epon (838)). The stillage had water within it. The boards had a specific gravity of 0.73 and were cured at a pressure of 200 psi, a temperature of 325 degrees Fahrenheit for 45 minutes. Three samples were tested and they showed for the first sample a modulus of rupture of 592 psi and a modulus of elasticity of 306,508 psi; for the second sample, a modulus of rupture of 610 psi and a modulus of elasticity of 339,853 psi; and for the third sample, a modulus of rupture of 296 and a modulus of elasticity of 172,325.

Example 12

Thirty-three parts of milo stillage were mixed with 100 parts of wood chips, 8 parts of oxirane (Ciba-Geigy (9138)) obtainable from Ciba-Geigy Corporation. The stillage had water within it. The boards had a specific gravity of 0.73 and were cured at a pressure of 200 psi, a temperature of 325 degrees Fahrenheit for 45 minutes. Three samples were tested and they showed for the first sample a modulus of rupture of 727 psi and a modulus of elasticity of 414,257 psi; for the second sample, a modulus of rupture of 690 psi and a modulus of elasticity of 391,991 psi; and for the third sample, a modulus of rupture of 968 and a modulus of elasticity of 446,867.

Example 13

Thirty-three parts of milo stillage mash were mixed with 100 parts of wood chips, 8 parts of oxirane (Ciba-Geigy (9138)) obtainable from Ciba-Geigy Corporation. The stillage had water within it. The boards had a specific gravity of 0.715 and were cured at a pressure of 200 psi, a temperature of 325 degrees Fahrenheit for 45 minutes. Three samples were tested and they showed for the first sample a modulus of rupture of 1034 psi and a modulus of elasticity of 539,984 psi; for the second sample, a modulus of rupture of 869 psi and a modulus of elasticity of 476,859 psi; and for the third sample, a modulus of rupture of 645 and a modulus of elasticity of 201,008.

Example 14

The effect of the thick corn stillage was studied here. The quantity of oxirane blended with 100 parts of corn stillage and 100 parts of sawdust, were 0, 5, 10 and 15 parts. The new stillage and old stillage, of which the distinction was the length of the storage period, were both selected as protein sources. In this case, the so-called old stillage was about three months older than the new stillage. The results of the study described in Table 3 reveal that the length of the period of time in storage does affect the mechanical properties as the function of protein in stillage may depend upon the extent of protein damage during storage period when mold is growing gradually. New stillage performs better than the old.

TABLE 3

Effect of Increasing Oxirane on Modulus Of Corn Stillage Board

| Sawdust 1b | Corn Stillage 1b | Oxirane 1b | MOE psi | MOR psi |
|---|---|---|---|---|
| | | Old | | |
| 100 | 100 | 0 | 82,300 | 562 |
| 100 | 100 | 10 | 90,900 | 738 |
| 100 | 100 | 15 | 78,200 | 646 |
| | | New | | |
| 100 | 100 | 5 | 129,090 | 944 |
| 100 | 100 | 10 | 123,000 | 966 |

Example 15

The change into milo stillage as a protein source does not change the fact of bad mechanical performance with stillage although its properties do contain an optimal point. Various amounts of oxirane were added to 100 parts of sawdust and 100 parts of wet milo stillage. The parts tried were 0, 5, 10, 15, 20, 25, 30 and 40 parts. Table 4 provides a trend and show that 10 parts of oxirane was the best.

Example 16

The raw materials of milo stillage is a mixture of glycerides. Such oils are classified as semidrying oils, due to the relatively low unsaturation levels, which is a negative factor for a quality binder. The oil acts as a plasticizer and unstable. A significant amount of unsaturation provided by the double bond is needed for free radical polymerization. Since the chemical structure is nearly saturated, an effective initiator should be found for the polymerization of the glycerides. Furthermore, impurities created by other materials occurring in the composite may inhibit the

TABLE 4

Effect of Increasing Oxirane on Modulus of Milo Stillage Board

| Sawdust 1b | Milo Stillage 1b | Oxirane 1b | MOE psi | MOR psi |
|---|---|---|---|---|
| 100 | 100 | 0 | 106,000 | 738 |
| 100 | 100 | 5 | 108,000 | 755 |
| 100 | 100 | 10 | 113,000 | 775 |
| 100 | 100 | 15 | 97,500 | 702 |
| 100 | 100 | 20 | 71,300 | 591 |
| 100 | 100 | 25 | 62,100 | 509 |
| 100 | 100 | 30 | 57,000 | 436 |
| 100 | 100 | 40 | 42,600 | 369 | polymerization. Because the oils will act as plasticizers, their chemical incorporation into the polymer chain is mandatory.

Example 17

Various quantities of epoxide resix were added to 100 parts of fiber, 50 parts of dry thin milo stillage and 50 parts of water. The amounts tried were 5, 10, 15, 20, 25, 30, 35 and 40 parts (see Table 5). All samples were made to achieve equal specific gravities and were cured at 165 degrees Celsius for 5 hours. Table 5 provides an interesting trend. The optimized content was 25 parts of epoxy resin (E812) to 50 parts of dry thin milo stillage. At this epoxide concentration, the highest elastic and rupture moduli were recorded.

Additional epoxy after optimum concentration seemed to cause degradation due to an imbalance in the stoichiometric ratio between oxirane and polypeptides. The data shows the maximum at 25 parts of oxirane. Inasmuch as the resin cures utilizes oxirane and protein, this optimal point likely relates to chemical stoichiometry, which in turn maximizes crosslink extent and minimizes plasticizing effects of excess reactants that occur at higher and lower levels of oxirane content.

Data of Table 5 indicates a quality resin with a modulus of elasticity of 129,646 psi and the moduli of rupture of 1,030 psi respectively, with 25 parts oxirane. The board was not as good as commercial product. The performances of modulus are 10.6 percent and 52.7 percent lower respectively. If the oil is not polymerized, it acts as a resin plasticizer.

From the above cases, the best moduli of elastic results are presented by corn germ-oil extracted. The defatted corn germ, corn stillage modulus results are better than oil included corn germ, corn stillage. The oil included corn germ, corn stillage, and milo stillage are not recommended as comparison to commercial board. Future research should include a protein analysis to see if increased stillage content, perhaps at reduced fiber content, will improve product performance.

Example 18

Three different epoxide resins were used in the cures, including Epon 828, Epon 812 and aliphatic oxirane RD2 and various quantities of epoxide resin were added to 100 parts of fiber, 50 parts of oil including

TABLE 5

Effect of Increasing Oxirane on Modulus Using Dry, Thin Milo Stillage

| Sawdust lb | Water lb | Oil included Milo Stillage lb | Oxirane (E812) lb | Elasticity MOD (PSI) | Rupture MOD (PSI) |
|---|---|---|---|---|---|
| 100 | 50 | 50 | 5 | 89,278 | 718 |
| 100 | 50 | 50 | 10 | 110,738 | 906 |
| 100 | 50 | 50 | 15 | 121,788 | 947 |
| 100 | 50 | 50 | 20 | 125,715 | 1,001 |
| 100 | 50 | 50 | 25 | 129,645 | 1,003 |
| 100 | 50 | 50 | 30 | 112,773 | 874 |
| 100 | 50 | 50 | 35 | 102,391 | 874 |
| 100 | 50 | 50 | 40 | 77,064 | 758 | corn stillage and 50 parts of water. The amounts tried were 5, 10, 15 and 20 parts (see Table 6). All samples were made to achieve equal specific gravities and cured at 165 degrees Celsius for 5 hours. The best modulus of elasticity result is presented by E812 (10, 15 and 20 parts). Since the aliphatic Epon 812 and RD2 are less viscous, they are easier to blend and spread over the cellulose fiber particle. In addition to this, both of them have smaller weight-functionality ratio than Epon 828 does, the modulus of elasticity and rupture result are presented by Table 6.

Example 19

Two different epoxide resins were used in the cures, including Epon 828, Epon 812 and various quantities of epoxide resin were added to 100 parts of fiber, 50 parts of oil extracted corn stillage and 50 parts of water. The amount tried were 5, 10, 15 and 20 parts (see Table 7). All samples were made to achieve equal specific gravities and cured at 165 degrees Celsius for 5 hours. The better modulus of elasticity and rupture are presented by E812 (5, 10, 15 and 20 parts) than with E828. The modulus of elasticity and rupture result are presented by Table 7.

TABLE 6

Comparison Effect of Different Oxirane on Modulus Using Dry, Thin Corn Stillage

| Oxirane lb | Sawdust lb | Water lb | Oil Included Milo Stillage lb | Elasticity MOD (PSI) | Rupture MOD (PSI) |
|---|---|---|---|---|---|
| E828 (5) | 100 | 50 | 50 | 42,070 | 441 |
| E812 (5) | 100 | 50 | 50 | 57,131 | 524 |
| RD2 (5) | 100 | 50 | 50 | 82,611 | 647 |
| E828 (10) | 100 | 50 | 50 | 32,433 | 366 |
| E812 (10) | 100 | 50 | 50 | 106,589 | 905 |
| RD2 (10) | 100 | 50 | 50 | 80,563 | 678 |
| E828 (15) | 100 | 50 | 50 | 52,587 | 481 |
| E812 (15) | 100 | 50 | 50 | 111,012 | 870 |
| RD (15) | 100 | 50 | 50 | 105,515 | 890 |
| E828 (20) | 100 | 50 | 50 | 47,190 | 452 |
| E812 (20) | 100 | 50 | 50 | 113,130 | 855 |
| RD2 (20) | 100 | 50 | 50 | 82,214 | 948 |

TABLE 7

Comparison Effect of Different Oxirane on Modulus Using Dry, Thin Defatted Corn Stillage

| Oxirane lb | Sawdust lb | Water lb | Oil Included Corn Stillage lb | Elasticity MOD (PSI) | Rupture MOD (PSI) |
|---|---|---|---|---|---|
| E828 (5) | 100 | 50 | 50 | 51,130 | 835 |
| E812 (5) | 100 | 50 | 50 | 69,151 | 825 |
| E828 (10) | 100 | 50 | 50 | 61,980 | 480 |
| E812 (10) | 100 | 50 | 50 | 145,410 | 1,335 |
| E828 (15) | 100 | 50 | 50 | 90,340 | 640 |
| E812 (15) | 100 | 50 | 50 | 162,690 | 1,640 |
| E828 (20) | 100 | 50 | 50 | 86,125 | 565 |
| E812 (20) | 100 | 50 | 50 | 82,286 | 1,080 |

Example 20

Different quantities of epoxide resin (Epon 828) were added to 100 parts of fiber, 50 parts of oil included corn stillage and 50 parts of water. The amounts tried were 5, 10, 15, 20 and 25 parts (see Table 8). All samples were made to achieve equal speccific gravities and were cured at 165 degrees Celsius for 5 hours. Data of Table 8 shows the optimized content was 15 parts of epoxy resin to 50 parts of oil included corn stillage.

At this epoxide concentration, the highest elasticity and rupture modulus were recorded. The experiment resulted in a composite with amodulus of elasticity of 52,587 psi and the moduli of rupture of 482 respectively, i.e., the board was not good. If this is compared with the defatted corn stillage, the performances of modulus are only 32.3 percent and 29.3 percent respectively. If the oil is not polymerized, it acts as a resin plasticizer.

TABLE 8

Comparison Effect of Different Oxirane on Modulus Using Defatted Corn Germ

| Oxirane lb | Sawdust lb | Water lb | Oil Included Corn Stillage lb | Elasticity MOD (PSI) | Rupture MOD (PSI) |
|---|---|---|---|---|---|
| E828 (10) | 100 | 50 | 50 | 138,630 | 1,687 |
| E812 (10) | 100 | 50 | 50 | 252,260 | 2,774 |
| RD2 (10) | 100 | 50 | 50 | 158,172 | 1,939 |
| E828 (15) | 100 | 50 | 50 | 174,720 | 1,960 |
| E812 (15) | 100 | 50 | 50 | 281,755 | 2,969 |
| RD2 (15) | 100 | 50 | 50 | 177,944 | 2,256 |
| E828 (20) | 100 | 50 | 50 | 151,037 | 1,784 |
| E812 (20) | 100 | 50 | 50 | 254,362 | 2,667 |
| RD2 (20) | 100 | 50 | 50 | 159,693 | 2,137 |
| E828 (30) | 100 | 50 | 50 | 158,463 | 1,634 |
| E812 (30) | 100 | 50 | 50 | 190,187 | 2,175 |
| RD2 (30) | 100 | 50 | 50 | 108,204 | 1,504 |

Example 21

Effect of increasing oxirane with an additional 50 parts of yeast are summarized by Tables 9 and 10. This additional protein is more improved than the performance of the composite of Example 20.

Figure 3:
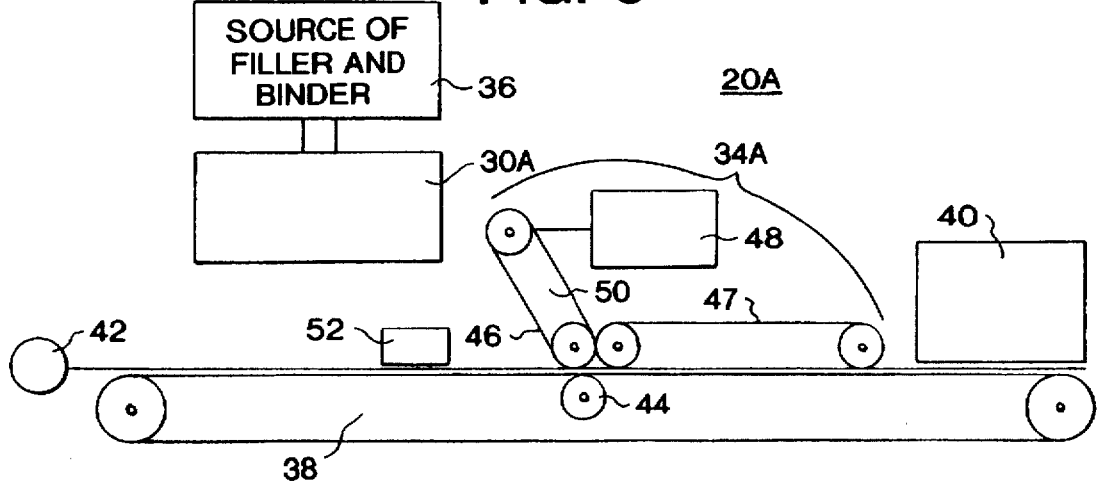
FIG. 3 is another embodiment of the process of using the binder shown in FIG. 2.

In FIG. 3, there is shown an apparatus 20A for forming fuel bricks or pellets having a source 36 of material to be formed into the bricks which may include a binder and a filler. The apparatus 20A also includes the mold 30A, a conveyor apparatus 38, a press 34A and a heat tunnel 40. This equipment is positioned so that the feedstock from the source 36 is applied to a mold 30A and from there on to the conveyor 38 which carries it underneath the mold 30A for applying pressure to enhance or articulate polymerization. The pressed bricks or pellets are then carried under a heat tunnel 40 which cures them and forms them or cuts them to size.

The mold 30A is for a continuous conveyor application and includes pressure rollers 44 and 46 with the roller 44 being positioned beneath the top run of the endless belt of the conveyor 38 and the roller 46 being positioned above the top run of the endless belt 38. The rollers 44 and 46 are compressed against each other and moved either by the conveyor 38 or by a separate motor 48 which may drive one of the rollers such as the roller 46 through another endless belt or chain 50.

The brick or pellet, after passing between the two presses, are slightly released and then passes into the bite of the two endless belts 47 and 50, with the bottom run of the endless belt 47 and the top run of the conveyor 38 being positioned against each other to press against the board as it moves there between. A heater 52 is positioned immediately before the pressure rollers 44 and 46 to heat the bricks or pellets to a sufficient temperature so that the pressure created in the board by the pressure as it moves the rollers and the added heat from the heater 52 are sufficient to cause polymerization. The conveyor 38 can be of any conventional type utilizing an endless belt and may be adapted to draw a holding fabric from a roll 42 to form a base for the board.

In forming fuel bricks or pellets, the binder operates in one of two different modes or in both modes at the same time. In one mode, it penetrates the surface and then polymerizes to establish bonds between the two surfaces, or in a second mode it encompasses the surfaces and forms bonds or forms chemical linkages with the surface. If the binder is principally a protein, step growth polymerization takes place at the peptide

TABLE 9

Effect of Increasing Epon 828 on Modulus, Corn Stillage

| Sawdust 1b | Water 1b | Oil Included Corn Stillage 1b | Oxirane (E828) 1b | Elasticity MOD (PSI) | Rupture MOD (PSI) |
|---|---|---|---|---|---|
| 100 | 50 | 50 | 5 | 42,070 | 441 |
| 100 | 50 | 50 | 10 | 32,433 | 366 |
| 100 | 50 | 50 | 15 | 52,587 | 481 |
| 100 | 50 | 50 | 20 | 47,190 | 452 |
| 100 | 50 | 50 | 25 | 49,850 | 490 |

TABLE 10

Effect of Increasing Oxirane on Modulus, Dry Thin Corn Stillage, Plus 50 Parts Yeast

| Sawdust 1b | Water 1b | Oil Included Corn Stillage 1b | Oxirane (E828) 1b | Elasticity MOD (PSI) | Rupture MOD (PSI) |
|---|---|---|---|---|---|
| 100 | 50 | 50 | 0 | 86,158 | 725 |
| 100 | 50 | 50 | 5 | 64,934 | 685 |
| 100 | 50 | 50 | 10 | 103,070 | 770 |
| 100 | 50 | 50 | 15 | 89,226 | 678 |
| 100 | 50 | 50 | 20 | 85,140 | 647 | linkage but other reactions may occur with other compounds at the amide groups or at the carboxyl groups. Polymerization can be accomplished to some extent by heat and pressure but also may utilize catalysts or other reactants to bind at the peptide linkages.

If substantial lipids form part of the binder, the saturated lipids may be converted by catalysts or initiators to a more reactive form and the lipids may be polymerized by forming chain linkages from lipid to lipid or directly reacting the lipids together. In the preferred embodiment this conversion is by initiators in an addition polymerization reaction sometimes called chain-reaction or chain growth polymerization. The temperature of the composition board or other structure is raised either by pressure or by pressure and added heat to reach the decomposition temperature of the initiator, if any, incorporated in the bricks or pellets; otherwise, it is raised to a level above 300 degrees Fahrenheit. When an initiator is used, the temperature will be at the threshold or decomposition temperature of the initiator which will differ from initiator to initiator but will be generally above 80 degrees Fahrenheit.

As can be understood from the above description, the binder of this invention has the advantages of being inexpensive and forming a relatively strong adhesive. The fuel bricks or pellets have the advantages of being inexpensive and using waste materials.

Although a preferred embodiment of the invention has been described with some particularity, many modifications and variations of the preferred embodiment may be made without deviating from the invention. Therefore, it is to be understood that, within the scope of the appended claims, the invention may be practiced other than as specifically described.

What is claimed is:

1. A method of making a binder comprising the steps of:
  obtaining stillage waste containing protein; and
  bringing the stillage waste to a paste consistency sufficiently viscous to apply to refuse with no particle larger than 18 mesh wherein the binder includes only stillage without added effective ingredients.

2. A fuel pellet formed of waste material comprising:
  a binder including only naturally occurring effective materials;
  waste material used as a filler for the fuel pellet;
  said binder containing naturally occurring protein;
  said binder and filler material being compacted to a specific gravity of at least 0.4; and
  said protein being cross linked to provide sufficient strength and being a naturally occurring protein from an agricultural product.

3. A method of making a fuel pellet comprising the steps of:
  obtaining stillage having within it a protein with a thermoplastic microstructure and linear polymers of a molecular weight of at least 2,000 linked with peptide linkages of at least 50 in number;
  bringing the stillage to a consistency sufficiently viscous to be applied to waste material with any particles in it reduced in size to at least 18 mesh; and
  forming the product into a fixed shape under conditions which apply sufficient heat and pressure to initiate polymerization without adding other chemically active materials.

4. A method according to claim 3 in which the step of forming the product into a fixed shape under conditions which apply sufficient heat and pressure includes the step of increasing the, stillage to a temperature of at least 250 degrees Fahrenheit.

5. A method in accordance with claim 3 in which the step of forming the product into a fixed shape under conditions which apply sufficient heat and pressure includes the step of increasing the pressure on the stillage to at least 20 pounds per square inch.

6. A method in accordance with claim 3 in which the step of forming the product into a fixed shape under conditions which supply sufficient heat and pressure includes the step of maintaining the product for a time in the range of one to six hours at a temperature of between 195 degrees Celsius to 140 degrees Celsius with a water content in the range of $\frac{1}{8}$ to $\frac{1}{3}$ the total weight of the mixture and with stillage in the range of between $\frac{1}{4}$ to $\frac{1}{2}$ the total weight of the mixture.

* * * * *